(12) United States Patent
Wang et al.

(10) Patent No.: US 10,374,441 B2
(45) Date of Patent: Aug. 6, 2019

(54) BALANCED CONTROL STRATEGIES FOR INTERCONNECTED HETEROGENEOUS BATTERY SYSTEMS IN SMART GRID APPLICATIONS

(71) Applicant: Wayne State University, Detroit, MI (US)

(72) Inventors: Le Y. Wang, Novi, MI (US); Caisheng Wang, Troy, MI (US); George Yin, Northville, MI (US); Feng Lin, Troy, MI (US); Michael P. Polis, Grosse Pointe Park, MI (US)

(73) Assignee: Wayne State University, Detroit, MI (US)

( * ) Notice: Subject to any disclaimer, the term of this patent is extended or adjusted under 35 U.S.C. 154(b) by 27 days.

(21) Appl. No.: 15/326,600

(22) PCT Filed: Jul. 16, 2015

(86) PCT No.: PCT/IB2015/055406
§ 371 (c)(1),
(2) Date: Jan. 16, 2017

(87) PCT Pub. No.: WO2016/009389
PCT Pub. Date: Jan. 21, 2016

(65) Prior Publication Data
US 2017/0214246 A1 Jul. 27, 2017

Related U.S. Application Data

(60) Provisional application No. 62/025,289, filed on Jul. 16, 2014.

(51) Int. Cl.
*H02J 7/00* (2006.01)
*H02J 3/32* (2006.01)

(52) U.S. Cl.
CPC .............. *H02J 7/0018* (2013.01); *H02J 3/32* (2013.01); *H02J 2007/005* (2013.01); *Y02P 80/11* (2015.11)

(58) Field of Classification Search
CPC ..................... H02J 3/32; H02J 7/0014–7/0019
See application file for complete search history.

(56) References Cited

U.S. PATENT DOCUMENTS

| 8,198,863 B1 * | 6/2012 | Wortham | G01R 31/3624 320/132 |
| 2010/0213897 A1 * | 8/2010 | Tse | H02J 7/0013 320/116 |

(Continued)

FOREIGN PATENT DOCUMENTS

WO 2013/054672 A1 4/2013

OTHER PUBLICATIONS

Habiballah, Rahimi-Eichi Et Al: "Adaptive Paramater Identification and State-of-Charge Estimation of Lithium-ion Batteries".

(Continued)

*Primary Examiner* — Rexford N Barnie
*Assistant Examiner* — David A Shiao
(74) *Attorney, Agent, or Firm* — Fishman Stewart PLLC

(57) ABSTRACT

A battery network includes a plurality of heterogeneous batteries coupled to at least one energy source and one energy load, a plurality of switches coupled to the heterogeneous batteries, and the switches controllable having a duty cycle between 0 and 1. A controller is configured to characterize each of the plurality of heterogeneous batteries characteristics, determine duty cycles for each of the plurality of switches based on the characterization such that a charge applied from the at least one energy source or a discharge to the at least one energy load converges to a balanced state for the plurality of heterogeneous batteries, (Continued)

and apply the determined duty cycles to the plurality of switches.

19 Claims, 7 Drawing Sheets

(56) References Cited

U.S. PATENT DOCUMENTS

| | | | | |
|---|---|---|---|---|
| 2010/0244781 | A1* | 9/2010 | Kramer | H02J 7/0016 320/162 |
| 2012/0068540 | A1* | 3/2012 | Luo | H02J 3/32 307/48 |
| 2012/0274140 | A1 | 11/2012 | Ganor | |
| 2012/0319652 | A1* | 12/2012 | Namou | H02J 1/108 320/116 |
| 2013/0221926 | A1* | 8/2013 | Furtner | G06F 1/263 320/129 |
| 2013/0335026 | A1* | 12/2013 | Reynolds | H02J 7/0016 320/112 |
| 2014/0125284 | A1 | 5/2014 | Qahouq | |
| 2014/0145670 | A1 | 5/2014 | van Zwam et al. | |
| 2014/0152261 | A1* | 6/2014 | Yamauchi | B60L 11/1866 320/118 |
| 2015/0333666 | A1* | 11/2015 | Miller | H02P 4/00 318/139 |

OTHER PUBLICATIONS

E.Cready, J. Lippert, J. Pihl, I. Weinstock, and P. Symons, Technical and Economic Feasibility of Applying Used EV Batteries in Sationary Applications. A Study for the DOE Energy Storage Systems Program, Sandia National Labs., Albuquerque, NM, Report: SAND2002-4084; SENTECH-068-006, 130p, Mar. 2003.

Chevy Volt Batteries for Neighborhood Energy Storage, Online, http://www.forbes.com/sites/uciliawang/2011/08/08/chevy-volt-batteries-for-neighborhood-energy-storage/.

Nissan Using Old LEAF Batteries in New Solar Charging Stations, Online, http://nissan-leaf.net/2011/08/13/nissan-using-old-leaf-batteries-in-new-solar-charging-stations/.

Stephen W. Moore and P. Schneider, A Review of Cell Equalization Methods for Lithium Ion and Lithium Polymer Battery Systems, SAE Publication 2001-01-0959, 2001.

N. H.Kutkut, H.L.N. Wiegman, D.M. Divan and D. W. Novotny,"Design considerations for charge equalization of an electric vehicle battery system," IEEE Trans. Ind. Appl.., vol. 35, pp. 28-35, Feb. 1999.

DOE Report: The Potential Benefits of Distributed Generation and Rate-Related Issues that May Impede Their Expansion, 2007.

M. Sitterly, L.Y. Wang, G. Yin, C. Wang, Enhanced Identification of Battery Models for Real-Time Battery Management. IEEE Transactions on Sustainable Energy, vol. 2, Issue 3, pp. 300-308, 2011.

Lezhang Liu, Le Yi Wang, Ziqiang Chen, Caisheng Wang, Feng Lin, Hongbin Wang, Integrated system identification and state-of-charge estimation of battery systems, IEEE Transactions on Energy Conversion, vol. 99, pp. 1-12, 2013.

Le Yi Wang, Michael Polis, George Yin, Wen Chen, Yuhong Fu, Chris Mi, Battery cell identification and SOC estimation using string terminal voltage measurements, IEEE Transactions on Vehicle Technology, vol. 61, pp. 2925-2935, Sep. 2012.

G. Yin, Y. Sun, and L.Y. Wang, Asymptotic properties of consensus-type algorithms for networked systems with regime-switching topologies, Automatica, 47, pp. 1366-1378, 2011.

T. Li and J. F. Zhang, Consensus conditions of multi-agent systems with time-varying topologies and stochastic communication noises, IEEE Trans. on Automatic Control, vol. 55, No. 9, 2043-2057, 2010.

E. Barsoukov, J. Kim, C. Yoon, H. Lee, Universal battery parameterization to yield a non-linear equivalent circuit valid for battery simulation at arbitrary load, J. Power Sour. 83 (1/2), pp. 61-70, 1999.

V. Johnson, M. Zolot, and A. Pesaran, Development and validation of a temperature-dependent resistance/capacitance battery model for Advisor, Proceedings of the 18th Electric Vehicle Symposium, Berlin, Germany, Oct. 2001.

K. Takano, K. Nozaki, Y. Saito, A. Negishi, K. Kato, and Y. Yamaguchi, Simulation study of electrical dynamic characteristics of lithium-ion battery, J. Power Sour. 90 (2), pp. 214-223, 2000.

Krasovskii, N. N. Problems of the Theory of Stability of Motion, (Russian), 1959. English translation: Stanford University Press, Stanford, CA, 1963.

LaSalle, J.P. Some extensions of Liapunov's second method, IRE Transactions on Circuit Theory, CT-7, pp. 520-527, 1960.

G. Plett, Extended Kalman filtering for battery management systems of LiPB-based HEV battery packs. Part 1 Background, J. Power Sour. 134 (2), pp. 252-261, 2004.

S. Rodrigues, N. Munichandraiah, and A. Shukla, A review of state-of-charge indication of batteries by means of ac impedance measurements, J. Power Sour. 87 (1/2), pp. 12-20, 2000.

* cited by examiner

BALANCED CONTROL STRATEGIES FOR INTERCONNECTED HETEROGENEOUS BATTERY SYSTEMS IN SMART GRID APPLICATIONS

CROSS REFERENCE TO RELATED APPLICATIONS

This application is a U.S. National Phase Application of PCT/IB2015/055406, filed on 16 Jul. 2015, which claims priority to U.S. Provisional Application No.: 62/025,289 filed on 16 Jul. 2014, both of which are hereby incorporated by reference in their entirety.

GOVERNMENT RIGHTS

This disclosure was made with government support under 1202133 awarded by the National Science Foundation. The government has certain rights in the disclosure.

BACKGROUND

As electric and hybrid electric vehicles (EV or HEV, which will be collectively called electric drive vehicles or EDV) vehicle retire, they introduce large quantities of retired batteries. Old EDV batteries that are no longer suitable for vehicle applications can still have substantial (up to 75-80%) capacity left. For instance, one million retired 15 kWh/40 kW EDV batteries with an average of 50% remaining power and energy capability can provide 7,500 MWh of energy capacity and 20,000 MW of power capacity, a huge waste if not utilized in secondary applications, such as energy storage for grid support. Sandia National Laboratories released a report on the technical and economic feasibility of such approaches several years ago. Several EDV manufacturers have announced their plans on using old EDV batteries for stationary energy storage.

Current battery management systems (BMS) employ balancing circuits for EDV battery systems. Since EDV usage has certain idle time (parking), battery cell balancing can be performed when the battery systems are not in use. To avoid power loss and reduce costs, usually cell balancing currents are relatively small. Consequently, cell balancing can effectively correct small cell imbalances. However, old battery packs have large variations in their capacities and in other parameters. In stationary usage to support grid operations, battery systems are often used all the time. As a result, new battery pack balancing strategies need to be developed.

Consider a typical scenario of one or more battery systems that support smart grid operations, in which intermittent power sources such as wind farms and photovoltaic (PV) solar electrical systems power a network of battery packs. The battery systems may be connected or connectable to the electric grid, and may also provide power to EDVs, office and residential buildings, factories, and the like. The battery packs may be situated as either stationary and stored in distributed locations, or are EDV batteries which are dynamically configured to be part of the interconnected battery systems.

Retired battery packs, however, are of different types, capacities, ages, and operating conditions, having come from any number of manufacturers, and having different designs. The battery packs are interconnected to form a supporting energy storage system. Charging and discharging such disparate and wide-ranging arrangements of battery packs present unique challenges, as the risk of battery overcharging can result in control schemes that do not take full advantage of the energy storage capability of the entire bank.

Management of used EDV batteries encounters more difficulty than for their primary EDV usage. First, they are typically re-characterized for the remaining capacity, internal impedance, and voltage/state-of-charge (SOC) curves. Secondly, different battery modules, in terms of their sizes, chemistry properties, voltage/current ratings, capacities, etc., are integrated into serial and parallel connections to form a large battery system. Due to their difference in capacity and internal resistance, their charge/discharge rates are controlled properly to avoid some typical detrimental effects, such as overcharge/overdischarge, reduced battery life, etc.

Therefore, there is a need for improved control during charge and discharge of a bank of heterogeneous batteries connected in series and parallel.

DETAILED DESCRIPTION

Figure 1:
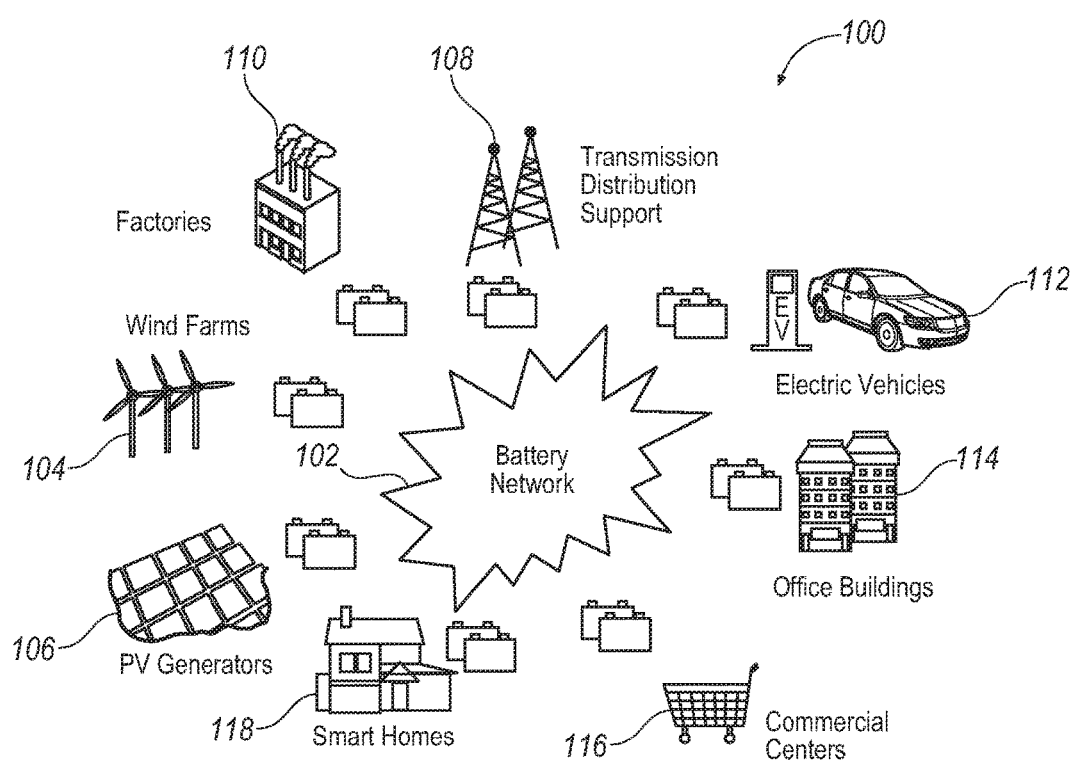
FIG. 1 schematically illustrates an exemplary system having a battery network power and load systems.

Referring now to the discussion that follows and the drawings, illustrative approaches to the disclosed systems and methods are described in detail. Although the drawings represent some possible approaches, the drawings are not necessarily to scale and certain features may be exaggerated, removed, or partially sectioned to better illustrate and explain the present disclosure. Further, the descriptions set forth herein are not intended to be exhaustive, otherwise limit, or restrict the claims to the precise forms and configurations shown in the drawings and disclosed in the following detailed description.

Desirable management schemes should provide the following important functions: Battery packs should be charged or discharged in a balanced manner so that battery capacities can be fully utilized and overcharge/overdischarge is avoided.

Disclosed herein are balanced charge/discharge strategies that distribute charge or discharge currents properly so that during operations battery pack balancing is continuously maintained. The strategies are termed as balanced charge/discharge control strategies for interconnected battery systems. Basic building blocks for the interconnected battery system are battery packs. Battery packs may have their own cell-level battery management systems, including internal cell balancing, charge/discharge protection, thermal management, charge/discharge rate control, etc. Typical examples are retired EDV battery packs which carry with them the original BMS. Disclosed herein is a system and method for charge/discharge coordination of battery packs in their interconnected system networks.

Implementation of control strategies includes accurate estimation of internal parameters of battery packs, and their state of charge (SOC). It is assumed that the joint estimation methodologies (i.e., battery characterization), introduced elsewhere and known in the art, are used to obtain this information. In addition to the management strategies, the disclosed ideas are extendable to other configurations. Disclosed herein is a cell estimation methodology that uses terminal voltage/current measurements for a string of battery cells (series connection), and introduces a method that uses terminal voltage/current measurements but achieves individual battery pack estimation for parallel connected battery packs.

FIG. 1 schematically illustrates an exemplary system 100 in which a battery network 102 is interconnected with intermittent power generating systems such as wind farms 104 and photovoltaic (PV) generators 106. System 100 may include a transmission distribution system 108 which may be interconnected with a stable power supply from a conventional electric grid. System 100 may include a variety of loads, of which a few exemplary systems are shown, that include factories 110, EDV charging stations 112, office buildings 114, commercial centers 116, and residences such as apartments complexes or smart homes 118.

Figure 2:
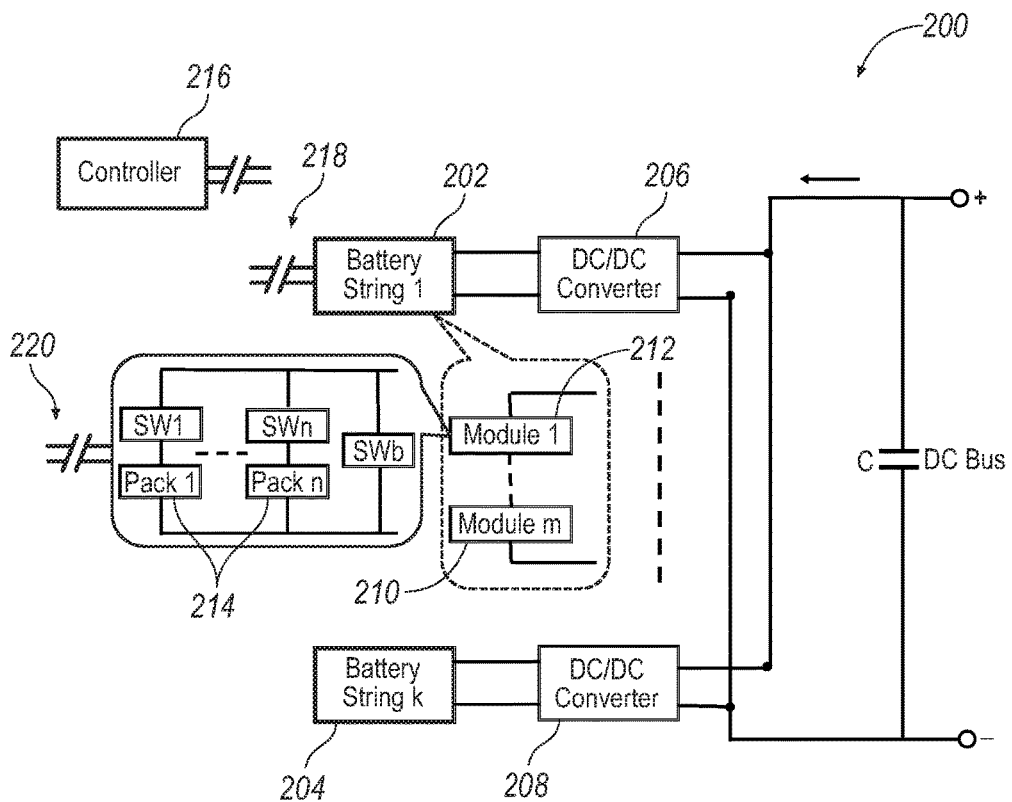
FIG. 2 illustrates a networked battery system that is built from heterogeneous battery packs via parallel and seriel connections and power electronics support.

Battery network 102 of FIG. 1 includes a networked battery system 200 that is built from heterogeneous battery packs, shown in FIG. 2. System 200 consists of a first string 202 of modules, and may include numerous strings up to K strings 204. Each string 202, 204 has its own bi-directional DC/DC converter 206, 208 to match a DC bus voltage specification. Each string 202 204 consists of m modules 210 which are serially connected. The value "m" may be different from string to string. Each module 210, 212 consists of n parallel connected battery packs 214 which, likewise, can vary from module to module. In this system configuration, battery packs 214 are the building units which may be of any variation, design, or style, and may have experienced differing amounts of usage in its initial use. System 200 includes a controller 216 that is coupled or connected to each string 218, as well as to each string 220 within each module. Controller 216 may be controllably operated by a computer system, a web-based system, or an application on a smart phone, as examples. Controller 216 is thereby able to controllably charge and discharge battery packs 214 within a module in a balanced fashion, as well as controllably charge and discharge modules 210, 212 within a string in a balanced fashion.

The disclosed control schemes of parallel packs and series modules work independently. The packs or modules do not have to be balanced before they are grouped together and controlled for a balanced operation. In a scenario with unbalanced packs and unbalanced modules, under the proposed control schemes, the packs in a module (i.e., Module i) will gradually have the same SOC (i.e. $SOC_i$) and the SOC of the module (Module i) will converge to the same, uniform $SOC_0$ with the other modules in the system.

In consideration of battery packs of different types, ages, and capacities, the packs are heterogeneous. That is, battery packs are different and heterogeneous from one another, and packs from module-to-module as well are heterogeneous. Further, it is contemplated that the packs are heterogeneous in the sense of having different overall characteristics, manufacturers, model type, and the like. However, it is also contemplated that in some cases the same pack model structure may be used in two packs, yet they are heterogenous from one another in that their characteristics differ due to having aged, having different manufacturing characteristics, and the like.

Parallel Connected Packs in Modules

Figure 3:
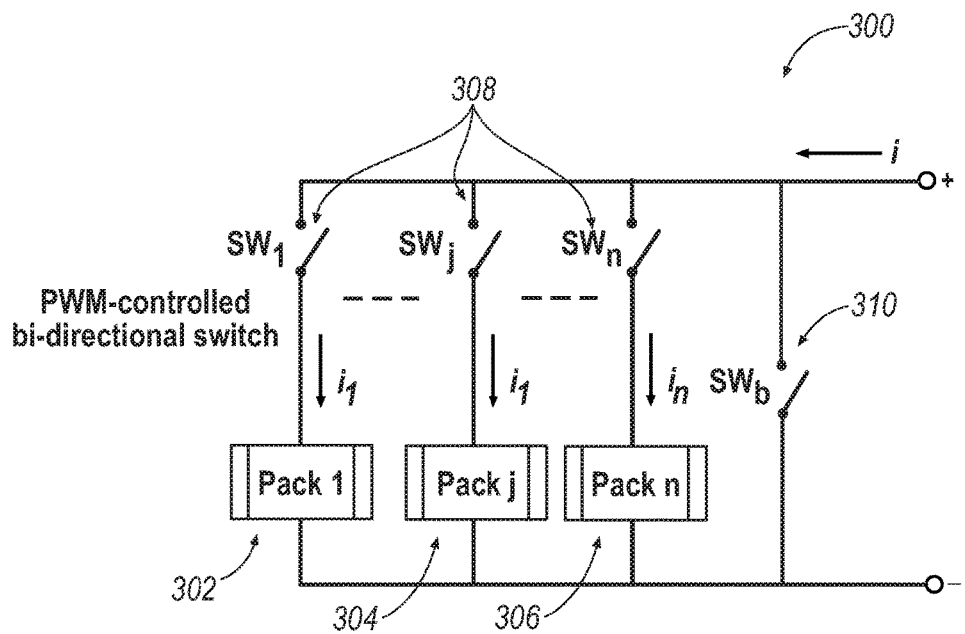
FIG. 3 illustrates the structure of a module having battery packs in parallel connection.

FIG. 3 illustrates a module 300 having n battery packs 302, 304, and 306 in parallel (n representing any number of packs arranged in parallel and within a practical design). This disclosure includes both module-level and string-level management strategies, which are building blocks for the overall battery management system. Due to variations in battery packs 302, 304, and 306, corresponding pulse-width module (PWM)-controlled four-quadrant switches 308, indicated by $SW_j$ in FIG. 3, are installed so that each battery pack's charge/discharge operation can be individually controlled.

As is known and in one example, PWM four-quadrant switches are used to encode or modulate a pulsing signal to control a duty cycle thereof. Thus, it is used to allow control of the amount of power supplied. In this example, an average voltage and current are fed to a load that is controlled by turning the switch between supply and load on and off and at a fast rate. The term "duty cycle" refers to the proportion of "on" time, is expressed in percent, and ranges from zero to one.

A bypass switch $SW_b$ 310 provides the capability to take the entire module 300 off of a charge/diacharge operation in real time. This is used, in one example, when the module is fully charged but other modules in the string may still be charging. Situations for discharge are similar. When switch $SW_b$ 310 is on, all other switches 308 in module 300 will be turned off to prevent short circuits.

Figure 4:
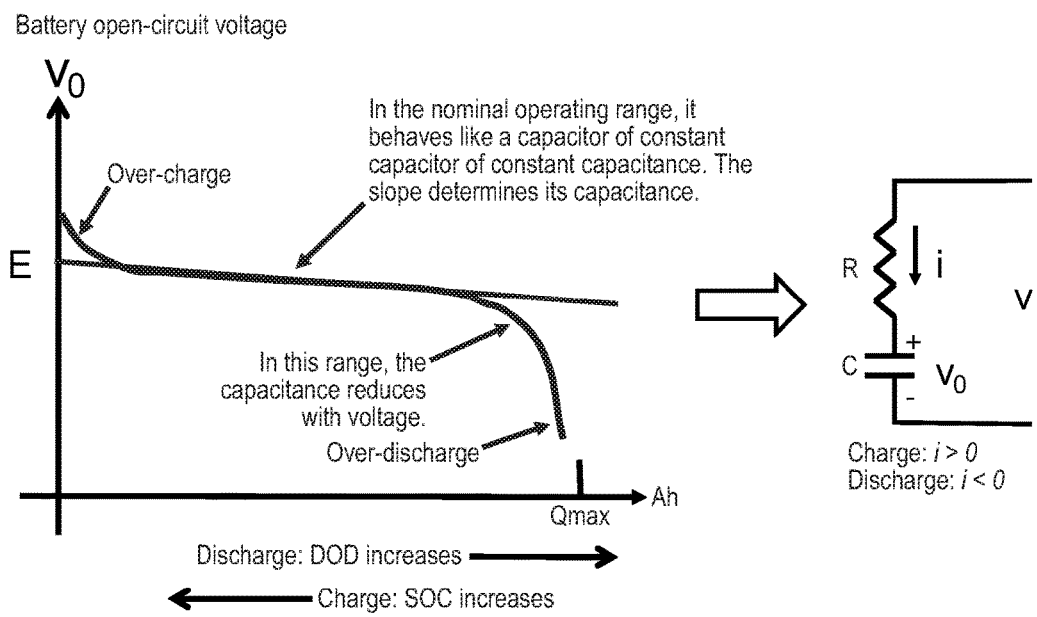
FIG. 4 illustrates typical charge/discharge characteristic curves.

Typical charge/discharge characteristic curves are shown in FIG. 4. Such curves represent relationships between the level of charge and the open-circuit voltage $v_0$.

To avoid overcharge or overdischarge the normal battery operations are in the middle range. In this range, the curve is nearly a straight line. Suppose that the battery starts at zero charge and its maximum capacity is $Q_{max}$ (Ah). Then in the nominal operating range this relationship can be represented by:

$$\frac{v_0(t)}{E} = \frac{\int_0^t i(\tau)d\tau}{Q_{max}}, \quad \text{Eqn. (1)}$$

$v_0(t)E=\int_0^t i(\tau)d\tau Q_{max}$, where E is defined in FIG. 4. Here $\int_0^t i(\tau)d\tau$ (Ah) is the total charge (coulomb counting). In the charge operation, the SOC, denoted by s(t), is defined as $$s(t)=\int_0^t i(\tau)d\tau/Q_{max}, \quad \text{Eqn. (2)}$$

$s(t) = \int_0^t i(\tau)d\tau/Q_{max}$. As a result, the linear relationship between the open circuit voltage (OCV) and SOC is $s(t) = v_0(t)/E$ in the nominal operating range. The differential equation form of Eqn. (1) is:

$$\left(\frac{Q_{max}}{E}\right)\dot{v}_0 = i.$$

In other words, the voltage-current dynamic relationship can be represented by a capacitor of capacitance $C = Q_{max}/E$ (Ah/V) or equivalently $C = 3600\, Q_{max}/E$ (F).

For the module management, $SW_b$ 310 is assumed off. During a charge operation, it is assumed that the charge source is a current source. As a result, the module terminal current i is the external input signal, which is measured. The module terminal voltage v is also measured. However, the pack currents $i_1, \ldots, i_n$ are not directly measured.

Figure 5:
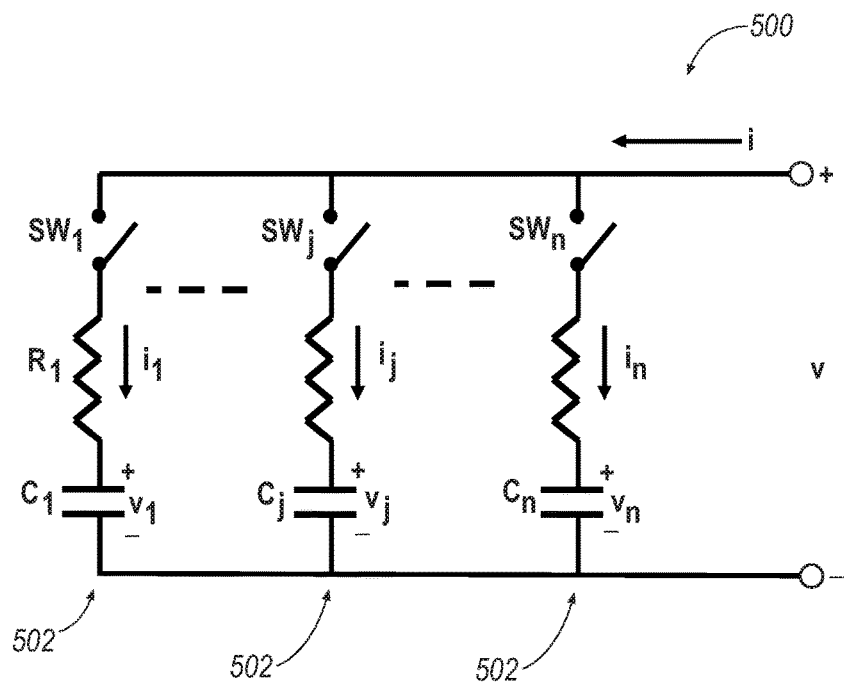
FIG. 5 illustrates a typical RC model structure 502 for each battery pack in parallel connection.

Referring to FIG. 5, for model development, module 500 (comparable to module 300 of FIG. 3) includes a typical RC model structure 502 for each battery pack, based on at least the following reasons. First, within normal operating ranges of a battery pack, its open circuit voltage is typically a linear function of the accumulated charges in Ah. As a result, its representation by a capacitor becomes valid. In that case, the capacitance $C_j$ represents the capacity of the battery pack. Second, such an approximation simplifies system analysis so that the main features of the disclosed methodologies can be clearly demonstrated. Third, if needed, more sophisticated battery model structures can also be used. While nonlinearities in more complex model structures will increase computational burdens, the fundamental concepts and procedures of the disclosed methods do not change.

During battery operations, model parameters for each pack differ due to battery types, aging, temperature, SOC, manufacturing conditions, and other environmental/operational conditions—thus the heterogeneous nature of not only battery packs that differ in design from one another, but also with respect to battery packs of the same design. Consequently, it is important that model parameters for battery packs are estimated during battery operations. This disclosure is focused on battery management strategies for banks of heterogeneous battery packs that are arranged as strings of modules arranged serially, and packs arranged in parallel with one another within modules, thus it is assumed that such system identification algorithms are known and have been used to identify model parameters. These parameters are thus assumed to be available in the management strategies of this disclosure.

The PWM control action for switch $SW_j$ will be denoted by $q_j$: If $q_j = 1$, then the switch $SW_j$ is turned on; and $q_j = 0$ turns the switch off. In typical applications of power electronics switches, PWM frequencies may range from a few kHz to 100 kHz or even higher. The duty cycle for $SW_j$ will be denoted by $d_j$. One consequence of such high-frequency switching in PWM control is that the typical averaging method that is used in analyzing power converters is also applicable here.

Let the admittance be $Y_j = 1/R_j$. The system equations are:

$$C_j \frac{dv_j}{dt} = q_j(t)i_j(t), \quad j = 1, \ldots, n,$$

$$i(t) = q_1(t)i_1(t) + \ldots + q_n(t)i_n(t),$$

$$v(t) = v_j(t) + i_j(t)R_j, \text{ if } q_j(t) = 1.$$

The last expression implies $i_j(t) = Y_j v(t) - Y_j v_j(t)$, if $q_j(t) = 1$.

Since $i_j(t) = 0$ when $q_j(t) = 0$, the resulting expression is:

$$i_j(t) = q_j(t)(Y_j v(t) - Y_j v_j(t)).$$

Since $q_j^2(t) = q_j(t)$, $$i(t) = \sum_{j=1}^{n} q_j(t) i_j(t)$$

$$= \sum_{j=1}^{n} q_j^2(t)(Y_j v(t) - Y_j v_j(t))$$

$$= \sum_{j=1}^{n} q_j(t)(Y_j v(t) - Y_j v_j(t)).$$

By taking the average over the PWM period:

$$\bar{i}(t) = \sum_{j=1}^{n} d_j(t)(Y_j \bar{v}(t) - Y_j \bar{v}_j(t))$$

$$= \bar{v}(t) \sum_{j=1}^{n} d_j(t) Y_j - \sum_{j=1}^{n} d_j(t) Y_j \bar{v}_j(t)$$

Here, $\bar{i}(t)$, etc., denote all the average values, and $d_j(t)$, $j = 1, \ldots, n$, are the duty cycles of the pack switches and are control signals.

Let $\alpha_j(t) = d_j(t)Y_j$ and $\alpha(t) = \sum_{j=1}^{n} \alpha_j(t)$.

It follows that:

$$\bar{v}(t) = \frac{1}{\alpha(t)}\bar{i}(t) + \frac{1}{\alpha(t)} \sum_{j=1}^{n} \alpha_j(t) \bar{v}_j(t).$$

Similarly, from $i_j(t) = q_j(t)(Y_j v(t) - Y_j v_j(t))$ and by taking the average over T, $$\bar{i}_j(t) = d_j(t)(Y_j \bar{v}(t) - Y_j \bar{v}_j(t)),$$

$$= \frac{\alpha_j(t)}{\alpha(t)}\bar{i}(t) + \frac{\alpha_j(t)}{\alpha(t)} \sum_{k=1}^{n} \alpha_k(t)\bar{v}_k(t) - \alpha_j(t)\bar{v}_j(t).$$

Consequently, $$C_j \dot{\bar{v}}_j(t) = \bar{i}_j(t)$$

$$= \frac{\alpha_j(t)}{\alpha(t)} \sum_{k=1}^{n} \alpha_k(t)\bar{v}_k(t) - \alpha_j(t)\bar{v}_j(t) + \frac{\alpha_j(t)}{\alpha(t)}\bar{i}(t).$$

These lead to the state space model of the battery module, with input $\bar{i}(t)$, state variables $\bar{v}_j(t)$, and output $\bar{v}(t)$:

$$\dot{\bar{v}}_j(t) = \frac{\alpha_j(t)}{C_j \alpha(t)} \sum_{k=1}^{n} \alpha_k(t)\bar{v}_k(t) - \frac{\alpha_j(t)}{C_j}\bar{v}_j(t) + \frac{\alpha_j(t)}{C_j \alpha(t)}\bar{i}(t),$$

-continued $$j = 1, \ldots, n$$

$$\bar{v}(t) = \frac{1}{\alpha(t)} \sum_{k=1}^{n} \alpha_k(t) \bar{v}_k(t) + \frac{1}{\alpha(t)} \bar{i}(t).$$

Define $x(t)=[\bar{v}_1(t), \ldots, \bar{v}_n(t)]'$, $u(t)=\bar{i}(t)$, $y(t)=\bar{v}(t)$, and $d(t)=[d_1(t), \ldots, d_n(t)]'$, where Z' denotes the transpose of Z. Then the above state space model can be written as:

$$\begin{cases} \dot{x}(t) = A(d(t))x(t) + B(d(t))u(t) \\ y(t) = C(d(t))x(t) + D(d(t))u(t) \end{cases} \quad \text{Eqn. (3)}$$

where, $$A(d(t)) = \begin{bmatrix} -\frac{\alpha_1(t)}{C_1\alpha(t)}(\alpha(t)-\alpha_1(t)) & \cdots & \frac{\alpha_1(t)}{C_1\alpha(t)}\alpha_n(t) \\ \frac{\alpha_2(t)}{C_2\alpha(t)}\alpha_1(t) & \cdots & \frac{\alpha_2(t)}{C_2\alpha(t)}\alpha_n(t) \\ \vdots & & \vdots \\ \frac{\alpha_n(t)}{C_n\alpha(t)}\alpha_1(t) & \cdots & -\frac{\alpha_n(t)}{C_n\alpha(t)}(\alpha(t)-\alpha_n(t)) \end{bmatrix}$$

$$B(d(t)) = \begin{bmatrix} \frac{\alpha_1(t)}{C_1\alpha(t)} \\ \frac{\alpha_2(t)}{C_2\alpha(t)} \\ \vdots \\ \frac{\alpha_n(t)}{C_n\alpha(t)} \end{bmatrix}$$

$$C(d(t)) = \begin{bmatrix} \frac{\alpha_1(t)}{\alpha(t)}, & \cdots, & \frac{\alpha_n(t)}{\alpha(t)} \end{bmatrix}$$

$$D(d(t)) = \frac{1}{\alpha(t)}.$$

Although the state space model is linear with respect to the state $x(t)$ and input $u(t)$, it is nonlinear with respect to control $d(t)$. As a result, the coordinated control of battery module charge/discharge is inherently nonlinear.

Typical EDV battery systems, especially lithium-ion batteries, include cell balancing to maintain efficiency and avoid overcharge/overdischarge. Standard balancing strategies often use trickle balancing when the EDV is parked. Balancing currents are small to reduce energy loss. Cell balancing is achieved by either energy dispatching through shunt resistors or energy shuffling via capacitors/inductors and power electronics switching.

However, in stationary battery systems that support grid applications, battery systems are in use all the time. Thus it is desirable to achieve pack balancing during normal operations since off-line cell balancing is costly and reduces system availability.

First consider the following pack open-circuit voltage balanced charge strategies. Voltage balance is commonly used in battery management systems as an approximate alternative to more desirable SOC balancing. It is a suitable step here to illustrate how the disclosed balanced charge strategies work.

The goal is to make all $v_j$ be equal. During a charge operation, $i(t) \geq 0$ and $x(t)$ will not settle down to constant values. As a result, the charge control may be viewed in two phases: (1) Balancing Reaching Phase: Starting from a non-balanced $x(t)$, control action in this phase aims to balance $x(t)$. (2) Balance Maintenance Phase. Suppose that $x(t)$ is balanced. Then the control action in this phase aims to keep $x(t)$ balanced all the time.

Let the unknown voltage balance value be $\mu(t)$. Define $1=[1, \ldots, 1]'$. So, the balanced $x(t)$ is $x(t)=\mu(t)1$. First, the expression for $\mu(t)$ is established. Then, the following expression can be obtained $$\bar{i}(t) = \bar{v}(t)\sum_{j=1}^{n} d_j(t)Y_j - \mu(t)\sum_{j=1}^{n} d_j(t)Y_j = (\bar{v}(t)-\mu(t))\alpha(t); \quad \text{Eqn. (4)}$$

that is, $$\mu(t)=\bar{v}(t)-\bar{i}(t)/\alpha(t). \quad \text{Eqn. (5)}$$

Balance Maintenance Phase

Starting from $x(t)=\mu(t)1$, control action in this phase aims to control $d(t)$, $t \geq t_0$ such that $x(t)=\mu(t)1$ for all $t \geq t_0$. Since $d_j(t) \in [0,1]$, a normalization factor is used in choosing $\eta(t)$. Suppose that $\max_{j=1,\ldots,n} d_j(t)=1$. Let:

$$\max_{j=1,\ldots,n} \frac{C_j}{Y_j} = \frac{C_{j*}}{Y_{j*}}$$

Define:

$$\eta(t) \equiv \eta^* = \frac{Y_{j*}}{C_{j*}}$$

and $$d_1 = \frac{C_1}{Y_1}\eta^*, \ldots, d_n = \frac{C_n}{Y_n}\eta^*. \quad \text{Eqn. (6)}$$

Remark: It is observed that:

$$\eta^* = \frac{1}{\max_{j=1,\ldots,n} C_j/Y_j} = \frac{1}{\max_{j=1,\ldots,n} R_jC_j}$$

Since $R_jC_j$ is the time constant for the jth pack, $\eta^*$ is in fact the inverse of the largest time constant of the packs.

Theorem 1: Suppose that $x(t_0)=\mu(t_0)1$. Under constant control strategies, balance is maintained for all $t \geq t_0$, namely:

$$x(t)=\mu(t)1, t \geq t_0$$

for some $\mu(t)$. In addition, $$\mu(t) = \mu(t_0) + \frac{1}{C_1 + \ldots + C_n} \int_{t_0}^{t} \bar{i}(\tau)d\tau.$$

Proof: It is easy to verify that for any $d(t)$, $A(d(t))1=0$. Under Eqn. (6):

$$d_1 = \frac{C_1}{Y_1}\eta^*, \ldots, d_n = \frac{C_n}{Y_n}\eta^*.$$

Therefore, $\alpha_j(t)$ are constants and:

$$\frac{\alpha_1}{C_1} = \frac{\alpha_2}{C_2} = \ldots = \frac{\alpha_n}{C_n} = \eta^*. \qquad \text{Eqn. (7)}$$

It follows that:

$$\alpha_1 = C_1\eta^*, \ldots, \alpha_n = C_n\eta^* \qquad \text{Eqn. (8)}$$

and $$\alpha = \alpha_1 + \ldots + \alpha_n = (C_1 + \ldots + C_n)\eta^*. \qquad \text{Eqn. (9)}$$

Consequently, $$B(d(t)) = \frac{1}{C_1 + \ldots + C_n}\mathbf{1}.$$

It is now shown that $x(t) = \mu(t)\mathbf{1}$ satisfies Eqn. (3) for all $t \geq t_0$. Since $\dot{x}(t) = \dot{\mu}(t)\mathbf{1}$, this, together with Eqn. (3), implies:

$$\begin{aligned}\dot{x}(t) &= \dot{\mu}(t)\mathbf{1} \\ &= A(d)\mu(t)\mathbf{1} + B(d(t))\bar{i}(t) \\ &= \frac{1}{C_1 + \ldots + C_n}\mathbf{1}\bar{i}(t)\end{aligned}$$

Apparently, $x(t) = \mu(t)\mathbf{1}$ s solves Eqn. (3) with:

$$\dot{\mu}(t) = \frac{1}{C_1 + \ldots + C_n}\bar{i}(t) \qquad \text{Eqn. (10)}$$

Therefore, the balanced state is maintained for all $t \geq t_0$. Finally, by direct integration in (10):

$$\mu(t) = \mu(t_0) + \frac{1}{C_1 + \ldots + C_n}\int_{t_0}^{t}\bar{i}(\tau)d\tau.$$

Figure 6:
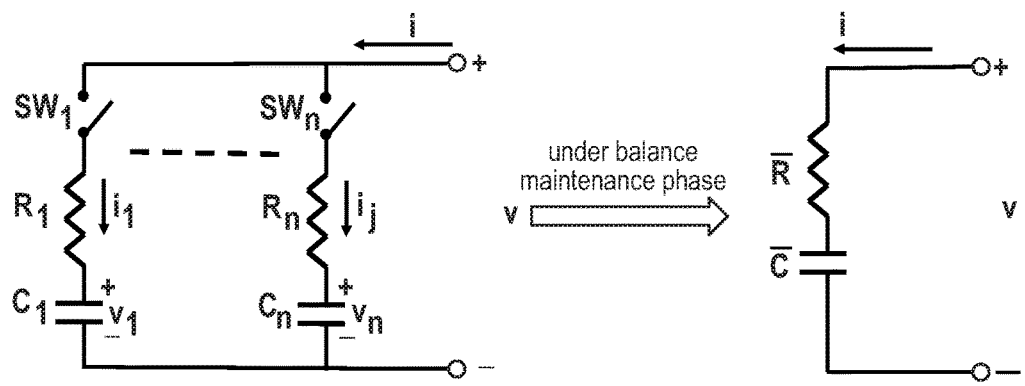
FIG. 6 illustrates that under a maintained balance operation the whole battery module acts like one battery of an equivalent capacity and an equivalence internal resistance.

Remark: Theorem 1 shows, as illustrated in FIG. 6, that under a maintained balance operation, the whole battery module acts like one battery of capacity:

$$\bar{C} = C_1 + \ldots + C_n,$$

and the open-circuit voltage $\bar{v}(t) = \mu(t)$. In addition, from Eqn. (4), the consolidated battery has an internal impedance $\bar{R} = 1/\alpha$, see FIG. 2. Note that:

$$\begin{aligned}\bar{R} &= \frac{1}{d_1 Y_1 + \ldots + d_n Y_n} \\ &= \frac{1}{\left(\frac{d_1}{R_1}\right) + \ldots + \left(\frac{d_n}{R_n}\right)}\end{aligned}$$

In other words, $\bar{R}$ is obtained by parallel connection of resistors of values $R_j/d_j$, $j=1, \ldots, n$.

Balance Reaching Phase

Starting at an un-balanced initial condition $x(0)$, the goal of control in the balance reaching phase is to design $d(t)$ so that $x(t)$ converges to the balanced state, namely, $x(t) - \mu(t)\mathbf{1} \to 0$ for some scalar function $\mu(t)$.

Although there are potentially many time-varying control strategies that can achieve convergence, the time-invariant control strategies in Eqn. (6) result in a linear time invariant system which is convergent to the balanced state. Such control strategies are highly desirable since it does not include online computation. An additional advantage is that these strategies are the same as that of the balance maintenance phase, which further simplifies control implementation.

To show the desired convergence property, denote the error of balance by $e(t) = x(t) - \mu(t)\mathbf{1}$. Here $\mu(t)$ is defined in Eqn. (5). Since $$\bar{v}(t) = C(d(t))x + \frac{1}{\alpha(t)}\bar{i}(t),$$

and $$\mu(t) = \bar{v}(t) - \bar{i}(t)/\alpha(t) = C(d(t))x.$$

Consequently, $$\begin{aligned}e(t) &= x(t) - \mu(t)\mathbf{1} \\ &= x(t) - \mathbf{1}C(d(t))x \\ &= (I_n - \mathbf{1}C(d(t)))x,\end{aligned}$$

where $I_n$ is the n-dimensional identity matrix. Under the control strategies, $d(t)$ is constant:

$$d^* = \left[\frac{C_1}{Y_1}\eta^*, \cdots, \frac{C_n}{Y_n}\eta^*\right]'$$

Let $\bar{C} = C_1 + \ldots + C_n$. From Eqns. (7), (8), and (9), the state space model matrices are simplified to:

$$\begin{aligned}A(d^*) &= \frac{\eta^*}{\bar{C}}\begin{bmatrix} -(\bar{C} - C_1) & C_2 & \cdots & C_n \\ C_1 & -(\bar{C} - C_2) & \cdots & C_n \\ \vdots & & & \vdots \\ C_1 & C_2 & \cdots & -(\bar{C} - C_n) \end{bmatrix} \\ &= \frac{\eta^*}{\bar{C}}(-\bar{C}I_n + \mathbf{1}[C_1, \ldots, C_n]) = \eta^*(-I_n + \mathbf{1}C(d^*))\end{aligned}$$

$$B(d^*) = \frac{1}{\bar{C}}\mathbf{1}, \; C(d^*) = \left[\frac{C_1}{\bar{C}}, \ldots, \frac{C_n}{\bar{C}}\right], \; D(d^*) = \frac{1}{\bar{C}}.$$

Theorem 2: Under constant control strategies, starting from any initial balance error $e(0)$, $$e(t) = e^{-\eta^* t}e(0), t \geq 0.$$

Proof: By Eqn. (10), $\mu(t) = \bar{v}(t) - \bar{i}(t)/\alpha(t)$. From:

$$\begin{aligned}\bar{v} &= C(d^*)x + \frac{1}{\alpha}\bar{i} \\ &= C(d^*)(e + \mu\mathbf{1}) + \frac{1}{\alpha}\bar{i} \\ &= C(d^*)e + \mu C(d^*)\mathbf{1} + \frac{1}{\alpha}\bar{i}\end{aligned}$$

-continued $$= C(d^*)e + \mu + \frac{1}{\alpha}i$$

Therefore, $C(d^*)e=0$.

From $e(t)=(I_n-1C(d^*))x$, the error dynamics can be expressed as:

$$\dot{e} = (I_n - 1C(d^*))\dot{x}$$
$$= (I_n - 1C(d^*))(A(d^*)x + B(d^*)\ddot{i}(t))$$
$$= (I_n - 1C(d^*))A(d^*)(e(t) + \mu(t)1) + \frac{1}{C}(I_n - 1C(d^*))1\ddot{i}(t)$$

However, $A(d^*)1=0$ and $(I_n-1C(d^*))1=1-1C(d^*)1=0$. Therefore, $$\dot{e}(t) = (I_n - 1C(d^*))A(d^*)e(t)$$
$$= (I_n - 1C(d^*))\eta^*(-I_n + 1C(d^*))e(t)$$
$$= -\eta^*(I_n - 1C(d^*))e(t)$$
$$= -\eta^*e(t).$$

This implies that:

$$e(t)=e^{-\eta^* t}e(0), t \geq 0.$$

Remark: Since $\eta^*=1/(R_{j^*}C_{j^*})$ where $R_{j^*}C_{j^*}$ is the largest time constant of the packs, $$e(t)=e^{-t R_{j^*} \cdot C_{j^*}}e(0).$$

In other words, convergence to the balanced state is exponentially fast and its exponential time constant is the largest one within the packs.

The control strategies are open-loop control and do not need any measurement information on the terminal voltage and current. In typical control systems, an open-loop control cannot guarantee convergence (i.e., stability) under varying initial conditions. The reason that the open-loop control can achieve convergence here can be explained as follows: Under the fixed duty cycles, if one pack, say pack 1, has a lower $\bar{v}_1$ than the average, then the charge current $(\bar{v}-\bar{v}_1)/R_1$ will become bigger than the current at the balance maintenance phase. This implies that $\bar{v}_1$ will rise faster. This is a natural feedback effect due to the structure of parallel connections. For serially connected battery systems, however, and as will be later discussed, such a feedback effect does not exist and a more delicate feedback scheme is disclosed to ensure convergence to a balanced state.

EXAMPLE 1

Consider a module that consists of five battery packs. The equivalent circuit parameters (the units are "F" for capacitors and "Ohm" for resistors) are: $C_1=5000$, $R_1=0.2$, $C_2=6000$, $R_2=0.3$, $C_3=4500$, $R_3=0.192$, $C_4=6210$, $R_4=0.117$, $C_5=5500$, $R_5=0.11$. The following values are calculated: $d_1=0.5556$, $d_2=1$, $d_3=0.4800$, $d_4=0.4037$, $d_5=0.3361$, $\alpha_1=2.7778$, $\alpha_2=3.3333$, $\alpha_3=2.5000$, $\alpha_4=3.4500$, $\alpha_5=3.0556$, $\alpha=15.1167$, $$A = 10^{-3} \begin{bmatrix} -0.4535 & 0.1225 & 0.0919 & 0.1268 & 0.1123 \\ 0.1021 & -0.4331 & 0.0919 & 0.1268 & 0.1123 \\ 0.1021 & 0.1225 & -0.4637 & 0.1268 & 0.1123 \\ 0.1021 & 0.1225 & 0.0919 & -0.4288 & 0.1123 \\ 0.1021 & 0.1225 & 0.0919 & 0.1268 & -0.4433 \end{bmatrix}$$

$$B = 0.3675 \times 10^{-4} 1$$

$$C = [0.1838, 0.2205, 0.1654, 0.2282, 0.2021]$$

$$D = 0.0662.$$

Figure 7:
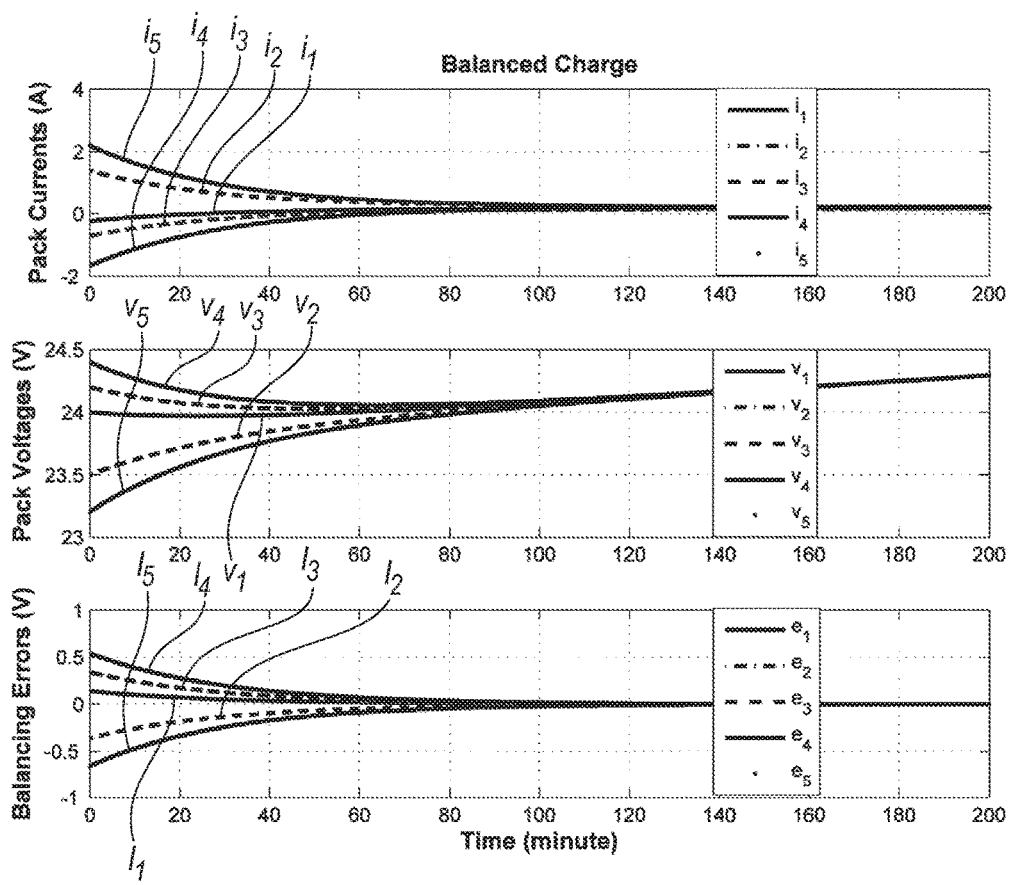
FIG. 7 illustrates exemplary plots of pack currents, pack voltages, and balancing error trajectories under time-invariant charge currents and shows how battery packs approach and maintain a balanced operation.

The states, in this example, are updated every second, and the simulation is run over 12000 updating points, namely, 200 minutes. Initial voltages (Volt) are $v_1(0)=24$, $v_2(0)=3.5$, $v_3(0)=24.2$, $v_4(0)=24.4$, $v_5(0)=23.2$. The charging current for the entire module is a constant 1 (A). At each updating time k, the average voltage:

$$v_{ave} = \frac{v_1(k) + \cdots + v_5(k)}{5}$$

is calculated and then the balancing errors are computed as $e_i(k)=v_i(k)-v_{ave}$, $i=1, \ldots, 5$. The pack currents, pack voltages, and balancing error trajectories are plotted in FIG. 7. Referring to FIG. 7, it takes about 150 minutes to complete the reaching phase. And after that the balanced charging strategies maintain the battery packs in a balanced state. In the maintenance phase, after approximately 150 minutes, the battery module behaves like a single capacitor/resistor system with:

$$C = C_1 + C_2 + C_3 + C_4 + C_5 = 27210,$$

$$R = \frac{1}{d_1/R_1 + d_2/R_2 + d_3/R_3 + d_4/R_4 + d_5/R_5} = 0.0743.$$

Also, it is observed that during the initial time period, the packs with higher initial voltages are actually being discharged to speed up the balancing process, resulting in higher charging currents for the packs with lower initial voltages. When balance is gradually achieved, the steady-state currents are approached, which are constants but still different due to the different parameters of the packs.

EXAMPLE 2

Figure 8:
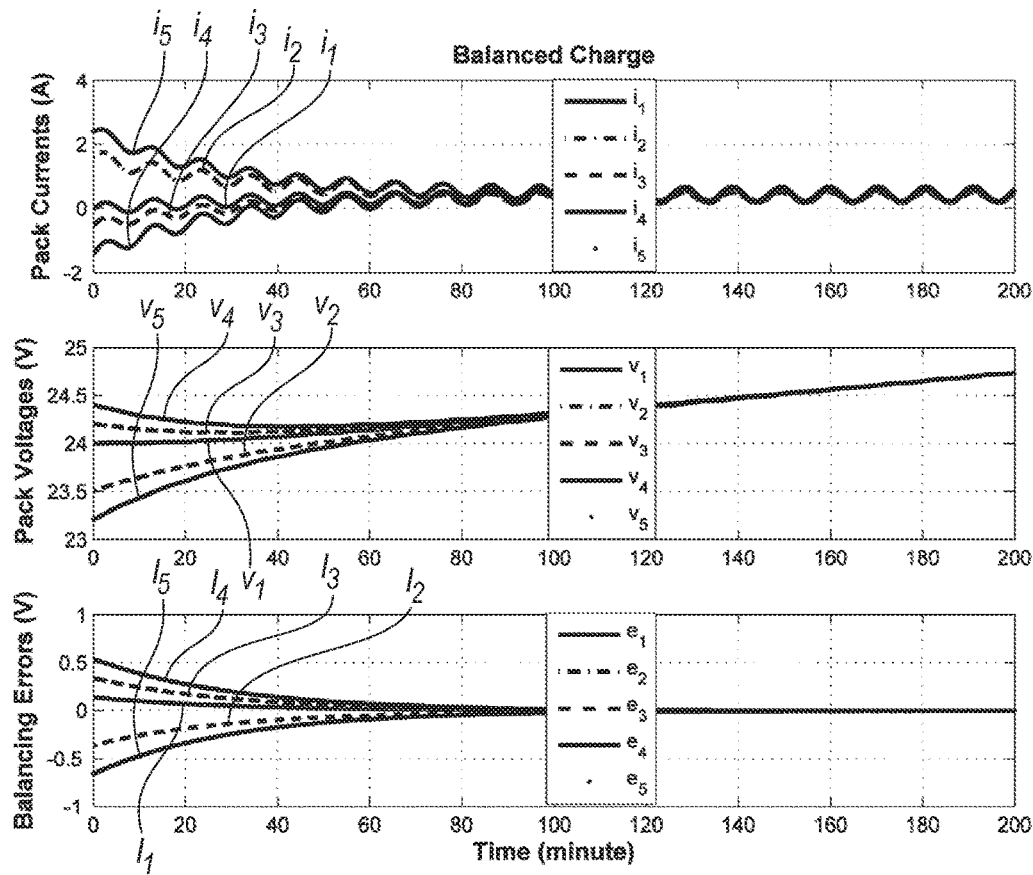
FIG. 8 illustrates exemplary plots of pack currents, pack voltages, and balancing error trajectories under time-varying charge currents and how battery packs retain balanced operation.

The balanced charge strategies work under time-varying charge currents. To show this, we use the same system as in Example 1, but the module external charge current is changed from a constant 1 (A) to a sinusoid $i(t)=2+\sin(0.01t)$. FIG. 8 shows that despite variations in pack charging currents, they do not affect negatively convergence to the balanced state or maintenance after reaching the balance.

EXAMPLE 3

The balancing control strategy in this section is an open-loop strategy. As a result, its performance depends on the parameters that are used in its design. In practical applications, battery model parameters are estimated by using voltage/current measurements. Due to measurement noises, parameter estimates are themselves random variables around their true values. When model parameters are estimated, the controlled duty cycles $d_i$ will be affected, which in turn affects the parameters $\alpha_i$. Consequently, balancing performance will differ.

In this example, we evaluate how balancing performance is affected by parameter estimation accuracy. This example uses the same system as in Example 2 with the same sinusoidally charging currents. To obtain more accurate residue balancing errors, the simulation length is doubled to N=24000 (400 minutes). The norm of the balancing errors at the final time is used as the size of balancing error. Since this is a random variable, we repeat this simulation 50 times and calculate their mean and variance.

Estimation errors for parameters are added as follows: For the true value $R_1$, its estimate is generated by $\hat{R}_1=(1+d)R_1$. Here d is an independent random variable which is uniformly distributed in $[-\delta, \delta]$. This is repeated for each model parameter. Table 1 lists the estimation error bounds $\delta$ and the corresponding balancing errors. Since parameter estimation errors within 10% are practically achievable, balancing performance levels remain reasonable under model estimation errors.

TABLE 1

Impact of Parameter Estimation Accuracy on Balancing Performance

| | $\delta$ | | | | |
|---|---|---|---|---|---|
| | 0 | 0.1 | 0.15 | 0.2 | 0.25 |
| error ave. (V) | 0.0013 | 0.0114 | 0.0149 | 0.0217 | 0.0295 |
| error var. | 0 | 0.0000 | 0.0000 | 0.0001 | 0.0001 |

The balanced charge/discharge strategies for parallel connected packs in battery modules can balance battery packs during their normal operations. The disclosed control strategies are open-loop types and can be implemented without signal measurements if the battery parameters are known.

Therefore, for n battery packs connected in parallel, during rebalancing, each pack has its own duty cycle SW (denoted as $d_i$) that is a pulse width modulationi (PWM) control signal that varies between 0 and 1 and basically controls how much current goes into each string of the parallel packs within a module. Prior to re-balancing, each pack is characterized using an RC-equivalent battery model. The values of R and C in the model can change with the battery SOC, as indicated above. During re-balancing of the parallel connected battery packs in a module, there is no feedback control and the unique duty cycle for each leg remains fixed in each leg. The duty cycle for each pack is based off of the battery within the module having the largest time constant ($R_jC_j$). Therefore, the battery having the largest time constant within the pack will have a duty cycle of 1 and is the limiting factor in how long it takes for all packs to reach a balanced state.

Serial Connected Modules in Strings

Figure 9:
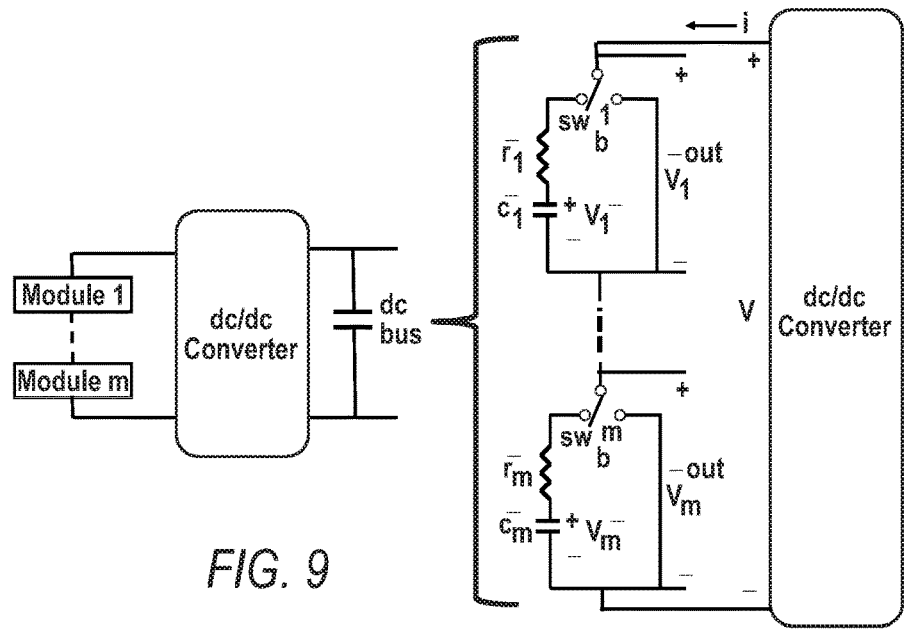
FIG. 9 illustrates serially connected modules in a string.

For serially connected modules in a string, shown in FIG. 9, the disclosed balanced charge/discharge control involves feedback control.

This section of the disclosure extends the control methods to balanced charge/discharge strategies for serially connected battery modules in strings. Furthermore, SOC-based balanced charge/discharge strategies are developed. The convergence properties of the proposed control methods are rigorously established and validated via simulation examples.

Continuing the development of balanced control strategies for heterogeneous battery systems, this section of the disclosure concentrates on control strategies for serially connected modules in battery strings. Owing to the serial connection topology, open-loop control strategies are shown to be non-convergent. A feedback scheme is therefore introduced that achieves convergence to the balanced state and maintains such a state afterward.

Under the balance maintenance phase of the modules, the jth module can be represented equivalently by a capacitor $\overline{C}_j$ and a resistor $\overline{R}_j$, referring back to FIG. 6. Charge/discharge control for modules within a string is achieved by PWM control of bypass switches, shown in FIG. 9. When a bypass switch $SW_b^j$ is on, the jth module is off line. The term $p_j$ is used to indicate the state of $SW_b^j$: If $p_j=1$, $SW_b^j$ is on; and if $p_j=0$, $SW_b^j$ is off.

PWM control of the bypass switches will result in fluctuations of the string terminal voltage v(t). The string DC/DC converter serves the purpose of power conditioning so that the converter output is controlled to satisfy DC bus connection.

Under a charge operation, the dynamic models for the modules in a string are:

$$\overline{C}_j\dot{\overline{v}}_j=(1-p_j)i, j=1,\ldots,m.$$

$$v_j^{out}=(1-p_j)(\overline{v}_j+\overline{R}_j i).$$

Let the complementary duty cycle, namely (1−duty cycle), for $SW_b^j$ be denoted by $\delta_j$. By the standard averaging method and by using the same notation for the voltages:

$$\overline{C}_j\dot{\overline{v}}_j=\delta_j i, j=1,\ldots,m.$$

$$v_j^{out}=\delta_j(\overline{v}_j+\overline{R}_j i).$$

$\delta=[\delta_1, \ldots, \delta_m]'$ are the control variables with the constraints:

$$0\leq \delta_j \leq 1, j=1,\ldots,m.$$

Denote the state variables:

$$\overline{x}=[\overline{v}_1,\ldots,\overline{v}_m]', \text{ and } \lambda(t)=\frac{1}{m}1'\overline{x}(t).$$

$\lambda(t)$ is the state average. The goal of balanced control strategies is to achieve convergence:

$$\overline{x}(t)-\lambda(t)1\to 0$$

during a balance reaching phase with an un-balanced initial condition, or sustain $\overline{x}(t)=\lambda(t)$ during a balance maintenance phase with a balanced initial condition. This control problem may be viewed as a consensus control problem. However, due to its special control constraints and nonlinear structures with respect to the duty cycles, the disclosed results of this paper are unique from the existing literature on consensus control problems.

Balance Maintenance Phase

Suppose that the state is balanced at $t_0$, $\overline{x}(t_0)=\lambda(t_0)1$. Control strategies in this phase aim to maintain:

$$\overline{x}(t)=\lambda(t)1, \forall t\geq t_0.$$

The following control strategy is disclosed. Let:

$$\zeta^* = \frac{1}{\max\limits_{j=1,\ldots,m}\overline{C}_j}$$

and $$\delta^* = [\overline{C}_1 \zeta^*, \ldots, \overline{C}_m \zeta^*]' = \zeta^*[\overline{C}_1, \ldots, \overline{C}_m]'$$  Eqn. (11).

Theorem 3: Suppose that $\overline{x}(t_0) = \lambda(t_0)\mathbf{1}$. Under a constant control strategy, the state balance is maintained for all $t \geq t_0$, namely:

$$\overline{x}(t) = \lambda(t)\mathbf{1}, t \geq t_0$$

and $$\lambda(t) = \lambda(t_0) + \zeta^* \int_{t_0}^{t} i(\tau)d\tau.$$

Proof:

$\dot{\overline{v}}_j = \delta_j / \overline{C}_j = \zeta^* i, j = 1, \ldots, m$ implies that $$\overline{x}(t) = \overline{x}(t_0) + \zeta^* \int_{t_0}^{t} i(\tau)d\tau \mathbf{1}$$
$$= \left(\lambda(t_0) + \zeta^* \int_{t_0}^{t} i(\tau)d\tau\right)\mathbf{1}.$$

This proves theorem 3.

Balance Reaching Phase

The goal of this phase is to design a control strategy for $\delta(t)$ such that starting from an un-balanced state $\overline{x}(t) \neq \lambda(0)\mathbf{1}$, $\overline{x}(t)\mathbf{1} \to 0$, as $t \to \infty$.

In the earlier section for pack control within a module, it was shown that an open-loop and constant control strategy for the balance maintenance phase is a convergent strategy for the balance reaching phase. However, for module control within a string, an open-loop strategy is not a convergent strategy.

Define the balance error $\varepsilon(t) = \overline{x}(t) - \lambda(t)\mathbf{1}$. Note that $\lambda(t)$ is the average of $\overline{x}(t)$.

Proposition 1 Under a constant control strategy, if the initial balance error $\varepsilon(0) \neq 0$, then:

$$\varepsilon(t) = \varepsilon(0) \neq 0, t \geq 0.$$

Proof:

$\overline{x}(t) = \overline{x}(0) + \zeta^* \int_0^t i(\tau)d\tau \mathbf{1}.$

This implies:

$$\lambda(t) = \frac{1}{m}\mathbf{1}'\overline{x}(t)$$
$$= \frac{1}{m}\mathbf{1}'\left(\overline{x}(0) + \zeta^* \int_0^t i(\tau)d\tau \mathbf{1}\right)$$
$$= \frac{1}{m}\mathbf{1}'\overline{x}(0) + \frac{1}{m}\mathbf{1}'\zeta^* \int_0^t i(\tau)d\tau \mathbf{1}$$
$$= \lambda(0) + \zeta^* \int_0^t i(\tau)d\tau.$$

Consequently, $$\varepsilon(t) = \overline{x}(t) - \lambda(t)\mathbf{1}$$
$$= \overline{x}(0)\zeta^* \int_0^t i(\tau)d\tau \mathbf{1} - \left(\lambda(0) + \zeta^* \int_0^t i(\tau)d\tau\right)\mathbf{1}$$
$$= \overline{x}(0) - \lambda(0)\mathbf{1}$$
$$= \varepsilon(0).$$

This difference between pack management in a module and module management in a string stems from system topology. In the former case, the packs are parallel connected to form a module; but in the latter case, the modules are serially connected to form a string. In particular, in the serially connection, the self-feedback effect of parallel-connected packs during charge operation does not exist in serially connected modules.

A modified feedback control strategy is now introduced from the open-loop control $\delta^*$. Since balancing control actions are duty cycles, they are confined in the range [0, 1]. A projection (bounding) operator is used to ensure this constraint being always met. For some scalar $\kappa > 0$, define:

$$\delta(t) = \Pi(\delta^* - \kappa \zeta^*(\text{diag}[\overline{C}_1, \ldots, \overline{C}_m])\varepsilon(t));$$  Eqn. (12)

where $\Pi$ is the bounding operator: For $y = [y_1, \ldots, y_n]' = \Pi(x)$ with $x = [x_1, x_2, \ldots, x_n]'$, $$y_i = \begin{cases} x_i, & \text{if } 0 < x_i < 1 \\ 0, & \text{if } x_i \leq 0 \\ 1, & \text{if } x_i \geq 1 \end{cases}$$

Here, inclusion of $\zeta^*$ in the expression is not essential but serves as a scaling factor so that choice of $\kappa$ will be more generic and independent of the actual values of $C_i$.

Theorem 4: Suppose that $0 < i_{min} \leq i(t) \leq i_{max}$. Suppose that the initial balancing errors are bounded by $\|\varepsilon(0)\| \leq b$. For sufficiently small $\kappa > 0$ depending on b, $$\|\varepsilon(t)\| \to 0, t \to \infty.$$

Proof: Convergence to the balancing state is shown by using the Lyapunov theory.

From $\varepsilon(t) = \overline{x}(t) - \lambda(t)\mathbf{1}$ and $$\lambda(t) = \frac{1}{m}\mathbf{1}'\overline{x}(t),$$

it can be obtained that $$\varepsilon(t) = \left(I_m - \frac{1}{m}\mathbf{1}\mathbf{1}'\right)\overline{x}(t).$$

From the state equation, $\dot{\overline{x}}(t) = \text{diag}[1/\overline{C}_j, \ldots, 1/\overline{C}_m]\delta(t)i(t)$. As a result, $$\dot{\varepsilon}(t) = \left(I_m - \frac{1}{m}\mathbf{1}\mathbf{1}'\right)\dot{\overline{x}}(t) = \left(I_m - \frac{1}{m}\mathbf{1}\mathbf{1}'\right)\text{diag}\left[\frac{1}{\overline{c}_1}, \ldots, \frac{1}{\overline{c}_m}\right]\delta(t)i(t)$$

By the feedback control, $$\dot{\varepsilon}(t) = \left(I_m - \frac{1}{m}\mathbf{1}\mathbf{1}'\right)\text{diag}\left[\frac{1}{\overline{c}_1}, \ldots, \frac{1}{\overline{c}_m}\right] \times$$
$$\Pi(\delta^* - \kappa\zeta^*(\text{diag}[\overline{C}_1, \ldots, \overline{C}_m])\varepsilon(t))i(t) = f(\varepsilon(t)).$$

If $\varepsilon = 0$, then:

$$f(0) = \left(I_m - \frac{1}{m}\mathbf{1}\mathbf{1}'\right)\text{diag}\left[\frac{1}{\overline{c}_1}, \ldots, \frac{1}{\overline{c}_m}\right]\Pi(\delta^*)$$

-continued $$= \left(I_m - \frac{1}{m}11'\right)\text{diag}\left[\frac{1}{\overline{C}_1}, \ldots, \frac{1}{\overline{C}_m}\right]\delta^*$$

$$= \left(I_m - \frac{1}{m}11'\right)\text{diag}\left[\frac{1}{\overline{C}_1}, \ldots, \frac{1}{\overline{C}_m}\right]\zeta^*[\overline{C}_1, \ldots, \overline{C}_m]'$$

$$= \left(I_m - \frac{1}{m}11'\right)1\zeta^*$$

$$= (1-1)\zeta^*$$

$$= 0.$$

Define $V(\varepsilon) = \varepsilon'\varepsilon$. Since $i(t)$ is bounded, V is well defined. Also, $V(\varepsilon)$ is positive definite and continuously differentiable. Now, $$\dot{V} = \dot{\varepsilon}'\varepsilon + \varepsilon'\dot{\varepsilon} = f'(\varepsilon)\varepsilon + \varepsilon'f(\varepsilon).$$

For sufficiently small $\kappa$, $\delta^* - \kappa\zeta^*(\text{diag}[\overline{C}_1, \ldots, \overline{C}_m])\varepsilon(t)$ is in the interior. Then $$f(\varepsilon) = \left(I_m - \frac{1}{m}11'\right)\text{diag}\left[\frac{1}{\overline{C}_1}, \ldots, \frac{1}{\overline{C}_m}\right] \times$$
$$(\delta^* - \kappa\zeta^*(\text{diag}[\overline{C}_1, \ldots, \overline{C}_m])\varepsilon(t))i(t)$$

$$= \left(I_m - \frac{1}{m}11'\right)(\zeta^*1 - \kappa\zeta^*\varepsilon(t))i(t)$$

$$= -\kappa\zeta^*\varepsilon(t)\left(I_m - \frac{1}{m}11'\right)\varepsilon(t)$$

$$= -\kappa\zeta^*\varepsilon(t)$$

since $$\left(I_m - \frac{1}{m}11'\right)1 = 0$$

and $1'\varepsilon(t)=0$. It follows that if $\varepsilon \neq 0$, $$\dot{V} = \kappa\zeta^*i(t)\varepsilon^2(t) < 0$$

since $i(t) \geq i_{max} > 0$. As a result, V is a Lyapunov function for $\varepsilon = f(\varepsilon)$ and $\varepsilon(t) \to 0$, $t \to \infty$, when $\|\varepsilon(0)\| \leq b$.

Remark: The convergence is not limited to small $\kappa$. However, to prove the case when the projection operator $\Pi$ is taking effect, the Global Krasovskii-LaSalle principle is employed, which will be mathematically much more involved and go beyond the scope of this application-oriented disclosure. However, some examples are used to show that when the bounding is taking effect, convergence can still be achieved.

EXAMPLE 4

Consider a string of five battery modules with the following parameters:

$C_1=25000$; $=0.052$;
$C_2=20000$; $R_2=0.1$;
$C_3=35000$; $R_3=0.032$;
$C_4=26710$; $R_4=0.07$;
$C_5=45500$; $R_5=0.022$.

The states are updated every second, and the simulation is run over 12000 updating points, namely, 200 minutes. The initial voltages (Volts) are:

$$v_1(0)=24.5, v_2(0)=23.5, v_3(0)=24.2$$

$$v_4(0)=24.1, v_5(0)=23.$$

The charging current for the entire module is a constant 10 (A). At each updating time k, the average voltage:

$$v_{ave} = (v_1(k) + \ldots + v_5(k))/5$$

is calculated and then the balancing errors are computed as:

$$e_i(k) = v_i(k) - v_{ave}, i=1, \ldots, 5.$$

Then $\delta_k$ is updated.

Figure 10:
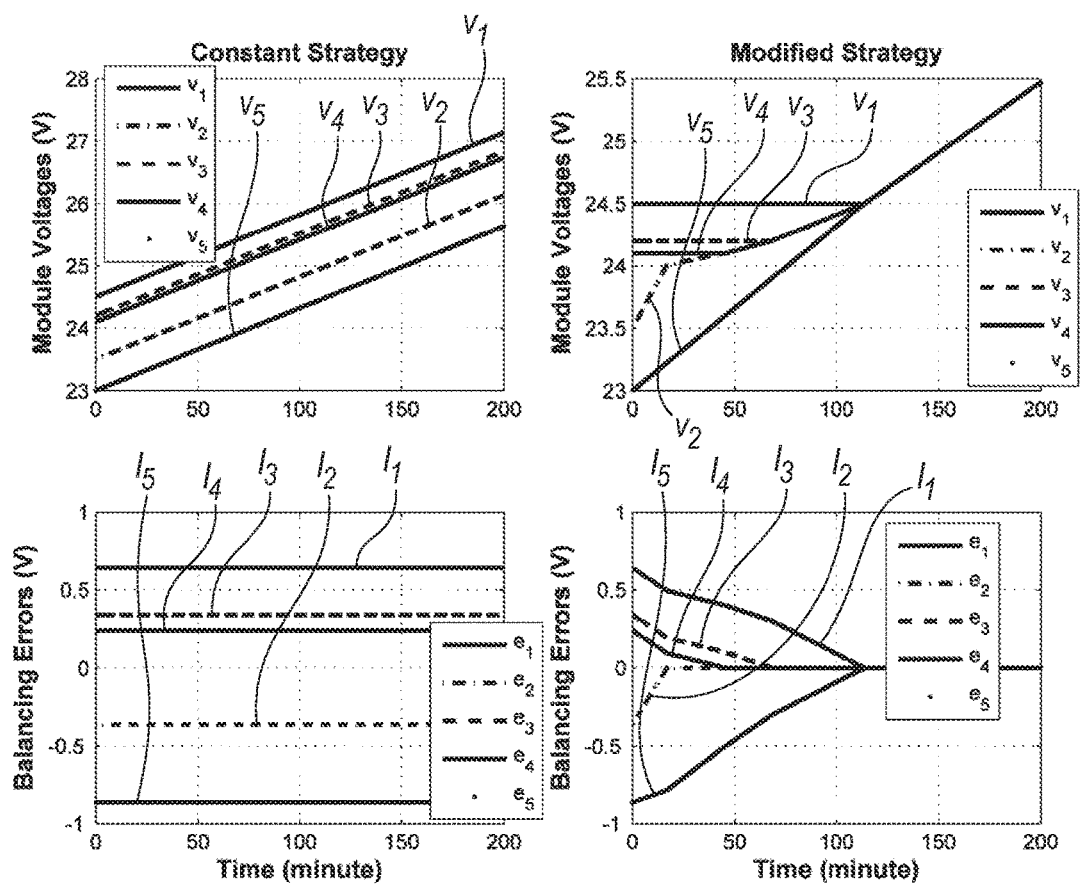
FIG. 10 illustrates module voltage and balancing error trajectories for a constant (unbalanced) vs. a modified (balanced) strategy.

The module voltage and balancing error trajectories are plotted in FIG. 10. The left plots represent the constant balancing strategy in which $\delta^*$ from (1) is used. For this example, $$\delta^* = [0.5495, 0.4396, 0.7692, 0.5870, 1]'.$$

The plots in FIG. 10 show that balancing is not achieved, consistent with Proposition 1. Then, the strategy is modified with $\kappa=1$. The right plots of FIG. 10 show that balancing is achieved. It can be seen that it takes about 115 minutes to complete the reaching phase. After that the balanced charging strategy maintains the battery modules in a balanced state.

EXAMPLE 5

Figure 11:
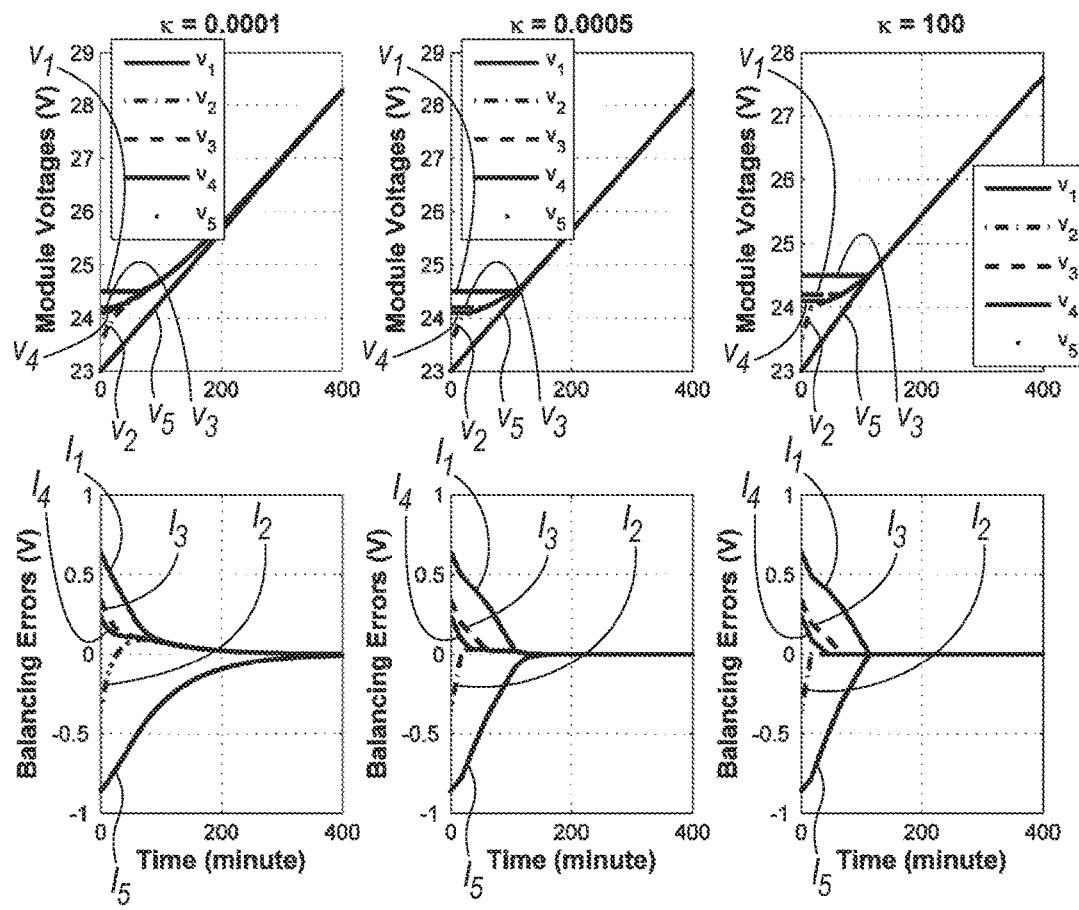
FIG. 11 illustrates strategies that are compared when different control gain values of κ are used.

In this example, the same system as Example 4 is considered. FIG. 11 illustrates strategies that are compared when different values of $\kappa$ are used. In the left plots of FIG. 11, a small value $\kappa=0.0001$ is used. Since $\kappa$ is small, the projection operator $\Pi$ is not taking effect. As a result, convergence to the balancing state is smooth and exponential. When $\kappa$ is increased to 0.0005, the projection operator starts to take effect at certain points. This is reflected in the discontinuity in the slopes of the curves in the middle plots of FIG. 11. Convergence is faster than the first case. Further increase of $\kappa$ to 100 will have a small improvement on convergence speed. When $\kappa$ is larger than certain values, their effects will not be perceivable. This is due to the fact that in battery balancing control, the control actions $\delta_i$ are confined to the range [0,1].

Thus, the duty cycle for each module is the control action that is calculated. However, due to the nature of the serial arrangement, duty cycles less than 0 and greater than 1 would be desired. Therefore a bounding operator is introduced that establishes the limits between 0-1. However, since these are not optimal, the individual battery voltages are measured periodically and used to update the duty cycle which, as has been proven, leads to convergence in all cases.

There is a natural feedback effect due to the structure of parallel connections, that is, all battery packs connected in parallel have the same terminal voltage. However, this is not the case anymore for serially connected battery packs. A more delicate feedback scheme is therefore employed to ensure convergence to a balanced state. This is why individual battery voltages need to be measured to update the duty cycle. The duty cycle cannot be less than 0 or greater than 1 and is a physical limit and there is no desire to push over it, therefore a bounding operator is used to enforce the limit. For battery modules connected in series, a battery module can be either connected in the path or disconnected from the path. As long as it is connected in the path, the same current flows through the battery module as the rest of the battery modules in the string.

SOC-Based Balanced Charge/Discharge Strategies and Nonlinear Circuit Models

More general problems of SOC-based balanced control strategies under nonlinear circuit models are disclosed.

When the battery is operated outside of the linear range, the relationship between the OCV and SOC becomes nonlinear, expressed generically as $$s(t) = f\left(\frac{v_0(t)}{E}\right)$$ Eqn. (13)

where $f(\cdot)$ is assumed to be continuously differentiable and invertible in the operating range. In the linear range, $f(u)=u$. Suppose that $g(u)=\partial f(u)/\partial u$. In the linear range, $g(u)=1$. It follows that:

$$\dot{s} = \frac{i(t)}{Q_{max}} = g\left(\frac{v_0(t)}{E}\right)\frac{\dot{v}_0(t)}{E},$$

that is, $$\frac{Q_{max}}{E}g\left(\frac{v_0(t)}{E}\right)\dot{v}_0 = C(v_0)\dot{v}_0(t) = i.$$ Eqn. (14)

In other words, the equivalent capacitance is now a function of $v_0$ and other variables $C=3600\times(Q_{max}/E)g(v_0(t)/E)$ Farad.

After taking into consideration the internal resistance of the battery pack, the circuit representation of the battery pack in FIG. 4 results. For charge/discharge control strategy development, the values of E, $Q_{max}$, R are estimated. Estimation algorithms were reported in recent papers.

From the basic relationship, $s_j(t)=f_j(v_j/E_j)$ the goal of balanced strategy is to achieve convergence:

$$s_j(t) \to \gamma(t), j=1, \ldots, n$$

for some common $\gamma(t)$.

Let $s(t)=[s_1(t), \ldots, s_n(t)]'$ and $(t)=[v_1(t), \ldots, v_n(t)]'$.

For notational simplification, henceforthe the over-line in the notation such as $\bar{v}_j(t)$, $\bar{v}(t)$, etc., is removed, with an understanding that all the variables are one-PWM-period averaged values.

Also, since some proofs are similar to those shown previously, they will either be omitted or abbreviated. Control strategies for packs in a module are used for exposition. Strategies for modules in a string follow the same derivations as above, and hence are omitted.

The balanced charge control problem for packs in a module is stated as follows: Under the dynamic system, $j=1, \ldots n$:

$$C_j \dot{v}_j(t) = d_j(t)i_j(t)$$

$$v(t) = v_j(t) + i_j(t)R_j,$$

$$i(t) = d_1(t)i_1(t) + \ldots + d_n(t)i_n(t)$$

where $C_j$ is a function of $v_j(t)$ and other variables, design the control strategy $d(t)=[d_1(t), \ldots, d_n(t)]'$, under the normalization condition $\max_{j=i, \ldots, n}d_j(t)=1$, such that $$s(t)-\gamma(t)1 \to 0 \text{ as } t \to \infty$$

for some $\gamma(t)$.

By assumption, $f(\cdot)$ is invertible and continuously differentiable. Denote the inverse function of $f_j(\cdot)$ by $h_j(\cdot)$, then $v_j(t)=E_j h_j(s_j(t))$. In particular, denote the desired OCV under the SOC-balanced state as:

$$\beta_j(t) = E_j h_j(\gamma(t)).$$

Let $\beta(t)=[\beta_1(t), \ldots, \beta_n(t)]'$. Then the desired OCV balanced control is:

$$e = x(t) - \beta(t) \to 0, t \to \infty.$$

The Balance Maintenance Phase

Suppose that at $t_0$, the SOCs of all the packs in a module are balances, namely, $s(t_0)=\gamma(t_0)1$. Correspondingly, $$x(t_0) = \beta(t_0) = [E_1 h_1(\gamma(t_0)), \ldots, E_n h_n(\gamma(t_0))]'$$

Therefore, $s_j(t)=f_j(v_j(t)/E_j)$. It follows that:

$$\dot{s}_j(t) = g_j\left(\frac{v_j(t)}{E_j}\right)\frac{1}{E_j}\dot{v}_j(t)$$

$$= g_j\left(\frac{v_j(t)}{E_j}\right)\frac{1}{E_j C_j(v_j(t))}d_j(t)i_j(t)$$

where $g(u)=\partial f(u)/\partial u$.

Define $$\rho_{min}(t) = \min_{j=1,\ldots,n} g_j\left(\frac{v_j(t)}{E_j}\right)\frac{1}{E_j C_j(v_j(t))}d_j(t)i_j(t),$$ Eqn. (15)

and $$d_j(t) = \frac{\rho_{min}(t)E_j C_j(v_j(t))}{g_j\left(\frac{v_j(t)}{E_j}\right)i_j(t)}, j=1,\ldots,n.$$

Theorem 5: Suppose that $s(t_0)=\gamma(t_0)1$. Under the control strategy, the SOC balance is maintained for all $t \geq t_0$, namely:

$$s(t) = \gamma(t)1, t \geq t_0$$

where:

$$\gamma(t) = \gamma(t_0) + \int_{t_0}^{t} \rho_{min}(\tau)d\tau.$$

Proof: Starting from $s(t_0)=\gamma(t_0)1$, $s(t)=\gamma(t)1$, $t \geq t_0$ if and only if:

$$\dot{s}_1 = \ldots = \dot{s}_n(t) = \dot{\gamma}(t),$$

or equivalently:

$$g_j\left(\frac{v_j(t)}{E_j}\right)\frac{1}{E_j C_j(v_j(t))}d_j(t)i_j(t) = \dot{\gamma}(t).$$

Suppose that the index $j^*(t)$ achieves:

$$\rho_{min}(t) = \min_{j=1,\ldots,n} g_j\left(\frac{v_j(t)}{E_j}\right)\frac{1}{E_j C_j(v_j(t))}i_j(t).$$

By normalization, $d_{j^*}(t)=1$, and $\dot{\gamma}(t)=\rho_{min}(t)$. Therefore, the control strategy for maintaining the balanced SOCs is given by:

$$d_j^*(t) = \frac{\rho_{min}(t)}{g_j\left(\frac{v_j(t)}{E_j}\right)\frac{1}{E_j C_j(v_j(t))}i_j(t)}$$

$$= \frac{\rho_{min}(t)E_j C_j(v_j(t))}{g_j\left(\frac{v_j(t)}{E_j}\right)i_j(t)}, j=1,\ldots,n.$$

In addition, $\dot{\gamma}(t)=\rho_{min}(t)$ can be solved as:

$$\gamma(t)=\gamma(t_0)+\int_{t_0}^{t}\rho_{min}(\tau)d\tau.$$

Remark: Due to nonlinearity and the SOC balancing requirement, unlike the linear cases, the control strategy is no longer an open-loop constant strategy.

The Balance Reaching Phase

Suppose now that:

$$s(t_0)-\gamma(t_0)1=s(t_0)-1's(t_0)1\neq 0.$$

Let $e(t)=s(t)-1's(t)1$. The control strategy is a convergent strategy to the balanced SOC.

Theorem 6: Under the constant strategy, starting from any initial SOC balance error $e(0)$, $$e(t)\rightarrow 0 \text{ as } t\rightarrow\infty.$$

Remark: The main idea to link a voltage balancing algorithm and an SOC balancing algorithm is to develop either a nonlinear mapping from the voltage to the SOC, or more comprehensively to device a reliable SOC estimation algorithm. Whenever SOCs are available, the disclosed balancing strategies can be readily modified to become an SOC balancing strategy.

CONCLUDING REMARKS

Departing from currently used battery balancing strategies, this disclosure offers new control based balancing strategies that achieve and maintain balanced states during routine battery operations. These new strategies offer distinct advantages:

(1) They accommodate heterogeneous battery packs of different types, ages, and capacities. This is of importance in implementing large grid scale battery storage systems using retired EDV batteries.

(2) Rather than dumping energy, or shuffling energy among battery packs, balancing during normal operation is achieved by tuning charge/discharge rates differently from one battery pack to another.

(3) When battery modules or strings are modified, the strategies are easily adapted to accommodate changes in battery system structures and parameters.

This work focuses on the introduction of the methodologies, and the validation of the fundamentals of the approach. It does not address potential implementation issues, some of which are enumerated here. First, the methods include new power electronics topologies. Although the switches are standard power electronics components, their selection and costs should be taken into consideration. Second, when implementing control strategies, there are different ways of coordinating all switches for the same duty cycles. Some of them will result in lower current and voltage ratings, and as such lower costs and power losses. Finally, cost vs. benefit analysis is of importance and would include collaboration between battery producers, utilities, and automotive companies so that economic, technological, and environmental impact can be better understood.

Batteries are important enabling technologies for accomplishing clean, efficient and sustainable energy development in transportation and power sectors. Parallel to battery material science advancement, it is important to develop effective BMS for safe, reliable, and optimal operations of batteries. Due to cell aging and operating condition variations, an effective BMS updates its control strategies by acquiring the most recent and individualized battery characteristics in real time. Challenges in advancing BMS technology are in accurately estimating a battery's SOC, State of Health (SOH) and other property parameters such as equivalent capacitance, internal resistance, etc., during battery operations. This disclosed technology process is used for managing retired batteries from electric drive vehicles (EDVs) for electric grid support. Rapid market expansion of EDVs has created a task to find appropriate ways of using retired batteries.

The approaches of this disclosure have the following distinctive and novel features: (1) Real-time, joint estimation. Battery's SOC, SOH and parameters will be jointly estimated for characterizing batteries in real time. (2) Fast, robust and accurate battery characterization. The joint estimation method will have an improved inverse sensitivity, accurate estimation capability, robustness to additive and error-in-variable noises, and fast convergence by applying random dithers in load currents, bias correction and noise attenuation mechanism, and optimal search algorithms for nonlinear system models. (3) Adaptive and optimal battery management. Based on the real-time battery characteristic information obtained via the disclosed joint estimation method, an adaptive charging algorithm with optimal charging frequency and an optimal cell balancing strategy accommodating both minimum energy loss and shortest time will be developed for achieving adaptive battery management. (4) Facilitating the second use of used EDV batteries. A cascaded inverter with flexible and cost effective structure may be used for integrating used EDV batteries for grid energy storage applications. SOC-weighted real and reactive power control may be used for highly reliable operation and uniform SOC distribution among batteries for used battery grid storage systems. (5) Versatile and transformative technologies. The methods disclosed are versatile for different types of batteries and model structures, and for new or old batteries.

It will be appreciated that the exemplary systems described herein have broad applications. The foregoing configurations were chosen and described in order to illustrate principles of the methods and apparatuses as well as some practical applications. The preceding description enables others skilled in the art to utilize methods and apparatuses in various configurations and with various modifications as are suited to the particular use contemplated. In accordance with the provisions of the patent statutes, the principles and modes of operation of the disclosure have been explained and illustrated in exemplary configurations.

It is intended that the scope of the present methods and apparatuses be defined by the following claims. However, it must be understood that the disclosed system may be practiced otherwise than is specifically explained and illustrated without departing from its spirit or scope. It should be understood by those skilled in the art that various alternatives to the configuration described herein may be employed in practicing the claims without departing from the spirit and scope as defined in the following claims. The scope of the disclosure should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future examples.

Furthermore, all terms used in the claims are intended to be given their broadest reasonable constructions and their ordinary meanings as understood by those skilled in the art unless an explicit indication to the contrary is made herein. In particular, use of the singular articles such as "a," "the,"

"said," etc., should be read to recite one or more of the indicated elements unless a claim recites an explicit limitation to the contrary. It is intended that the following claims define the scope of the device and that the method and apparatus within the scope of these claims and their equivalents be covered thereby. In sum, it should be understood that the device is capable of modification and variation and is limited only by the following claims.

What is claimed is:

1. A battery network, comprising:
    a plurality of heterogeneous batteries coupled in parallel, the plurality of heterogeneous batteries coupled to an electric grid that includes at least one energy source and one energy load;
    a plurality of switches coupled to the plurality of heterogeneous batteries, each battery having a switch in series, the plurality of switches each controllable via application of a pulse-width modulation (PWM) frequency such that a duty cycle is defined as a proportion of on time for each switch; and
    a controller configured to:
        characterize each battery of the plurality of heterogeneous batteries based at least on an RC equivalent model to determine a time constant for each of the plurality of heterogeneous batteries;
        determine a respective duty cycle for each switch of the plurality of switches based on the characterization of the of the respective plurality of heterogeneous batteries; and
        apply the determined duty cycle to each of the respective plurality of switches such that a charge applied from the grid or a discharge to the grid converges to a balanced state-of-charge (SOC) for each of the plurality of heterogeneous batteries.

2. The battery network of claim 1, wherein the plurality of heterogeneous batteries is arranged having two or more modules that are connected serially, each module comprising its own plurality of heterogeneous batteries and each module having its own respective switch of the plurality of switches.

3. The battery network of claim 2, wherein the controller is configured to determine a scalar value for each battery based on the characteristics of batteries within the two or more modules that, when applied to the switches, maintains the duty cycle between 0 and 1.

4. The battery network of claim 3, wherein the duty cycles applied to each of the switches are determined based on a largest equivalent module capacitance of all of the modules.

5. The battery network of claim 4, wherein the controller is configured to continuously re-characterize the SOC of each of the plurality of heterogeneous batteries in real time, and determine the scalar values based on the re-characterization.

6. The battery network of claim 1, wherein the plurality of heterogeneous batteries are arranged having two or more batteries, of the plurality of heterogeneous batteries, arranged in parallel with one another, each of the two or more batteries having its own respective switch of the plurality of switches.

7. The battery network of claim 6, wherein the controller is configured to determine the duty cycles based on a largest time constant of the determined time constants within each of the two or more batteries.

8. The battery network of claim 7, wherein battery time constants are determined based on a product of an equivalent resistance and capacitance for each of the two or more batteries.

9. The battery network of claim 1, wherein the at least one energy source includes one of a conventional electrical grid, a photovoltaic (PV) generator, and a wind farm.

10. The battery network of claim 1, wherein the controller is configured to apply the determined duty cycles until the balanced SOC is achieved and without re-characterizing the plurality of heterogeneous batteries.

11. A method of balancing a network of batteries, comprising:
    characterizing each battery of a plurality of heterogeneous batteries based on an RC equivalent model to determine a time constant for each battery, wherein the batteries are coupled in parallel and coupled to an electric grid that includes an energy source and an energy load, each battery having a switch in series such that a plurality of switches is coupled to the plurality of heterogeneous batteries, with each switch controllable via application of a pulse-width modulation (PWM) frequency;
    determining duty cycles for each of the plurality of switches based on the characterization of each respective battery of the plurality of heterogeneous batteries, each duty cycle defined as a proportion of on time between 0 and 1 for a respective battery; and
    applying the determined duty cycles via the PWM frequency to each of the respective plurality of switches such that a charge applied from the grid or a discharge to the grid converges to a balanced voltage state for each battery of the plurality of heterogeneous batteries.

12. The method of claim 11, wherein the plurality of heterogeneous batteries is arranged having two or more modules that are connected serially, each module comprising a plurality of heterogeneous batteries and each module having its own respective switch of the plurality of switches.

13. The method of claim 12, further comprising determining a scalar value based on the characteristics of batteries within the two or more modules that, when applied to the switches, maintains the duty cycle between 0 and 1.

14. The method of claim 13, further comprising determining the duty cycles to each of the switches based on a largest equivalent module capacitance of all of the modules.

15. The method of claim 14, further comprising continuously re-characterizing the state-of-charge (SOC) of the plurality of heterogeneous batteries in real time, and determine the scalar value based on the re-characterization.

16. The method of claim 11, wherein the plurality of heterogeneous batteries is arranged having two or more of the plurality of heterogeneous batteries arranged in parallel with one another, each of the two or more batteries having its own respective switch.

17. The method of claim 16, further comprising:
    determining the duty cycles based on a largest time constant within each of the two or more batteries; and
    determining the battery time constants based on a product of an equivalent resistance and capacitance for each of the two or more batteries.

18. The method of claim 11, further comprising applying the duty cycle of the switches using a pulse-width modulation (PWM) control.

19. The method of claim 11, wherein the step of applying the determined duty cycles comprises applying the determined duty cycles until the balanced SOC is achieved and without a step of re-characterizing the plurality of heterogeneous batteries.

* * * * *